US009510525B2

(12) United States Patent
Schmidt

(10) Patent No.: US 9,510,525 B2
(45) Date of Patent: Dec. 6, 2016

(54) AGRICULTURAL CROP AND FIELD SPRAYER AND METHOD FOR OPERATING AN AGRICULTURAL CROP AND FIELD SPRAYER

(71) Applicant: HARDI International A/S, Taastrup (DK)

(72) Inventor: Bjarne Schmidt, Frederiksberg (DK)

(73) Assignee: SA Exel Industries, Epernay (FR)

( * ) Notice: Subject to any disclaimer, the term of this patent is extended or adjusted under 35 U.S.C. 154(b) by 452 days.

(21) Appl. No.: 13/907,538

(22) Filed: May 31, 2013

(65) Prior Publication Data

US 2013/0320106 A1    Dec. 5, 2013

(30) Foreign Application Priority Data

Jun. 5, 2012    (DK) ................................ 2012 00386

(51) Int. Cl.
*A01G 25/16*    (2006.01)
*A01M 7/00*    (2006.01)

(52) U.S. Cl.
CPC ............ *A01G 25/16* (2013.01); *A01M 7/0089* (2013.01)

(58) Field of Classification Search
CPC .................................................. A01M 7/0089
See application file for complete search history.

(56) References Cited

U.S. PATENT DOCUMENTS

| 4,530,463 | A |   | 7/1985 | Hiniker et al. |
| 4,553,702 | A |   | 11/1985 | Coffee et al. |
| 5,475,614 | A | * | 12/1995 | Tofte .................... G05D 7/0635 700/283 |
| 6,285,938 | B1 |   | 9/2001 | Lang et al. |
| 6,581,574 | B1 | * | 6/2003 | Moran ................ F02D 41/2464 123/494 |
| 2009/0112372 | A1 |   | 4/2009 | Peterson |
| 2009/0235999 | A1 | * | 9/2009 | Engelbrecht ........ F16K 11/0873 137/625.46 |
| 2010/0200668 | A1 |   | 8/2010 | Hahn et al. |

FOREIGN PATENT DOCUMENTS

| DE | 19754373 | 6/1999 |
| EP | 2153710 | 2/2010 |

(Continued)

OTHER PUBLICATIONS

Anwar, et al., FF Control, Controls Wiki 1 (2007).

(Continued)

*Primary Examiner* — Mohammad Ali
*Assistant Examiner* — Saad M Kabir
(74) *Attorney, Agent, or Firm* — K. David Crockett, Esq.; Paul J. Backofen, Esq.; Crockett & Crockett, PC

(57) ABSTRACT

An agricultural sprayer (1) with a pump (20), a plurality of nozzles, a valve arrangement (28) associated with the nozzles and a feed conduit (25). The valve arrangement (28) selectively connects the feed conduit (25) to a bypass conduit (26) or to the nozzles. A return conduit (32) branches off from the feed conduit (25). A regulation valve (30) applies a variable degree of throttling to the fluid flowing through the return conduit. A pressure sensor (41) provides a signal for fluid delivered to the valve arrangement. A flow sensor (42) provides a signal representing the flow in the feed conduit (25). A controller (50) is in receipt of the sensor signals, receives instructions from an operator and controls the regulation valve (30) using the instructions from the operator and available measured signals using feedback control loops combined with a feed forward signal.

11 Claims, 5 Drawing Sheets

(56) References Cited

FOREIGN PATENT DOCUMENTS

| | | |
|---|---|---|
| GB | 2337984 | 8/1999 |
| WO | WO2006072248 | 7/2006 |

OTHER PUBLICATIONS

Office Action dated Dec. 3, 2015 issued in U.S. Appl. No. 13/907,498.

* cited by examiner

Sprayer System Layout

Sprayer System Controls

AGRICULTURAL CROP AND FIELD SPRAYER AND METHOD FOR OPERATING AN AGRICULTURAL CROP AND FIELD SPRAYER

This application claims priority to Danish Patent Application PA201200386 filed Jun. 5, 2012, the content of which are incorporated by reference.

FIELD OF THE INVENTIONS

The present disclosure relates to an agricultural crop and field sprayer and/or washer and method for controlling an agricultural crop and field sprayer and/or washer.

BACKGROUND ART

Agricultural crop and field sprayers, both pull-type sprayers and self-propelled sprayers, need to apply a correct and constant amount of liquid per hectare rate at any moment in time. Varying speed of the sprayer, varying wind conditions, overlapping areas, deactivation and activation before and after headland, and defect sensors pose challenges with respect application rate, acceptable pressure range and flow stability. Further, too high pressures result in a too fine spray that blows away with the wind and too low pressure causes insufficient spread and atomizing, thus there is a need to provide constant boom pressure and droplet size throughout the speed range. Ideally, the operator can drive according to field conditions without concern for pressure deviation, so average field speed can increase.

In known sprayers, the flow and pressure is controlled with a motorized regulation valve. This regulation valve typically has a movable valve member that defines a controllable flow opening and an electric drive motor coupled to the valve member via a reduction gear. The opening area of regulation valve can be varied continuously between two extreme positions through operation of the electric drive motor.

This type of regulation valve is precise, robust and reliable but is, in contrast to solenoid valves and the like slow to change position. This type of regulation valve can handle large flow with a relatively small pressure drop.

Solenoid valves without servo amplification are difficult to use in an agricultural crop and field sprayer because the valve is large and the required strength of solenoid is not practical. Servo amplification is normally not used since the sprayer fluid has, due to the chemicals/substances added to the water, properties that do not harmonize with hydraulic servo systems due to e.g. deposits in the servo system. Solenoid valves without servo are not suited to handle large flow with a relatively small pressure drop.

The slow response to demand of the regulation valve renders it difficult for the sprayer control system to respond adequately to changes in the operating conditions of the sprayer. The fact that this known type of sprayer typically operates with a fixed displacement pump increases the challenges for the control system of the sprayer.

US2009112372 discloses a spray control system for controlling an agricultural sprayer that includes a controller, a plurality of sensors and feedback means, and an output means for controlling the application system of the sprayer. The controller receives inputs from the operator through a user interface, and/or various feedback signals from the sensors of the system (e.g., a flow meter, or a pressure transducer). After processing these inputs, the controller sends signals to other components of the sprayer, such as, the pump, the storage means, the boom sections, and/or the nozzles, to maintain or change their operating conditions. This sprayer provides a spray control system that allows selection between a flow volume-based closed loop feedback control system, and pressure-based closed loop feedback control system, i.e. a system with two feedback source. The controller overrides the choice of the operator in the selection of the feedback control method, where the selected feedback source has failed (e.g., due to a component failure).

SUMMARY OF THE INVENTIONS

On this background, it is an object of the present application to provide an agricultural field sprayer that overcomes or at least reduces the problems indicated above.

This object is achieved by providing an agricultural crop and field sprayer. The sprayer includes a sprayer fluid tank, a pump, the inlet of the pump being in fluid communication with the tank, a boom divided in boom sections and each boom section being provided with a plurality of spray nozzles, a valve arrangement associated with the boom sections, a feed conduit for establishing fluid communication between an outlet of the pump and the valve arrangement, the valve arrangement being configured for selectively connecting the feed conduit to a bypass conduit or to one or more of the boom sections, a return conduit) branching off from the feed conduit, a regulation valve, the regulation valve applying a variable degree of throttling to the fluid flowing from the feed conduit through the return conduit, the variable degree of throttling depending on the position of the regulation valve, a controller, the controller being configured to be in receipt of a group of signals associated with the agricultural sprayer, the controller being configured to control the position of the regulation valve in accordance with a plurality of operation modes, and the controller being configured to automatically select an appropriate one of the operation modes, the plurality of operation modes including a full functionality mode and a plurality of fail-safe modes, the controller being configured to operate the agricultural crop and field sprayer in the full functionality mode when the all of the signals of said group are available to the controller, the controller being configured to operate the agricultural crop and field sprayer in one of the fail-safe modes when one or more of the signals of the group of signals is not available to the controller.

By providing a plurality of modes related to missing sensor signals the reliability and operability of the sprayer is significantly improved.

Preferably, there is a fail-safe mode for each one the situations where one of the signals in the group is not available to the controller.

In an embodiment there is a fail-safe mode for several situations where a combination of several of the signals of the group is not available to the controller.

In an embodiment the controller in the full functionality mode is configured to: control the position of the regulation valve in a closed loop using the pressure signal in relation to a desired pressure setpoint, to determine the restriction to flow of the active spray nozzles, determine the desired position for the regulation valve automatically in relation to the determined restriction to flow, and to adapt the desired pressure setpoint in relation to the sprayer speed signal.

In an embodiment the controller is configured in a first fail-safe mode to control the position of the regulation valve in a closed loop using the flow signal in relation to a desired flow rate setpoint, when the signal from the pressure sensor is not available.

In an embodiment the controller is configured to use the first fail-safe mode when the signal from the pressure sensor and the pump speed signal are not available.

In an embodiment the agricultural sprayer further comprising a second fail-safe mode used by the controller when the signal from the flow sensor is not available, wherein the controller in the second fail-safe mode does not determine the actual restriction to flow of the active spray nozzles, and wherein the controller is configured to determine the desired position of the regulation valve based on the last determined restriction to flow before flow sensor signal became unavailable or the controller is configured to determine the desired position of the regulation valve based on the an entry by an operator indicating the restriction to flow.

In an embodiment the controller is configured to use the second fail-safe mode when the signal from the flow sensor and the pump speed signal are not available.

In an embodiment the controller is configured in a third fail-safe mode to determine the desired position of the regulation valve based on an entry by an operator indicating the sprayer speed, when the sprayer speed signal is not available.

In an embodiment the controller is further configured to use feed forward control in the full functionality mode, and wherein the controller is configured in a fourth fail-safe mode not to use feed forward control when the pump speed signal is not available.

The object above is also achieved by providing a method of operating an agricultural crop and field sprayer, the sprayer comprising a sprayer fluid tank, a pump, the inlet of the pump being in fluid communication with the tank, a boom divided in boom sections and each boom section being provided with a plurality of spray nozzles, a valve arrangement associated with the boom sections, a feed conduit for establishing fluid communication between an outlet of the pump and the valve arrangement, the valve arrangement being configured for selectively connecting the feed conduit to a bypass conduit or to one or more of the boom sections, a return conduit branching off from the feed conduit, a regulation valve, the regulation valve applying a variable degree of throttling to the fluid flowing from the feed conduit through the return conduit, the variable degree of throttling depending on the position of the regulation valve, a controller, the controller being configured to be in receipt of a group of signals, the group of signals including a signal from: a pressure sensor providing a signal representing the pressure of the fluid delivered to the valve arrangement, a flow sensor providing a signal representing the flow rate of the flow to the valve arrangement, a regulation valve position sensor sensing the position of the regulation valve, a pump speed sensor sensing the speed of the pump, a sprayer speed sensor sensing the speed of the agricultural crop and field sprayer, controlling the position of the regulation valve in accordance with a plurality of operation modes, and automatically selecting an appropriate one of the operation modes, the plurality of operation modes including a full functionality mode and a plurality of fail-safe modes, operating the agricultural crop and field sprayer in the full functionality mode when the signal of the pressure sensor, the flow sensor, the regulation valve position sensor, the pump speed sensor and the sprayer speed sensor are all available, operating the agricultural crop and field sprayer in one of the fail-safe modes when one or more of the signals of the group of signals is not available to the controller.

Further objects, features, advantages and properties of the agricultural field and crop sprayer and the method according to the present disclosure will become apparent from the detailed description.

BRIEF DESCRIPTION OF THE DRAWINGS

In the following detailed portion of the present description, the disclosure will be explained in more detail with reference to the exemplary embodiments shown in the drawings, in which.

DETAILED DESCRIPTION OF PREFERRED EMBODIMENTS

Figure 1:
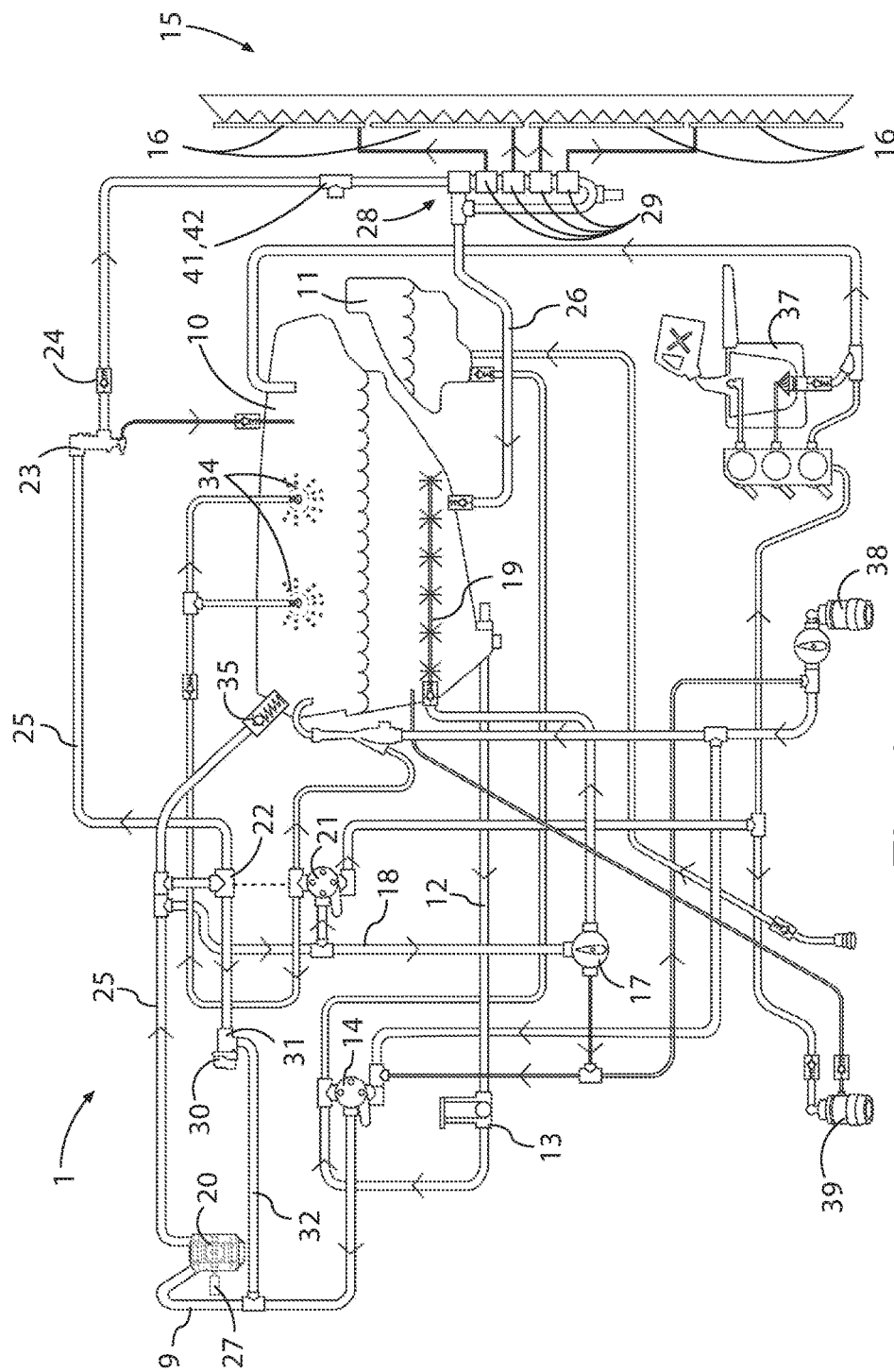
FIG. 1 is detailed diagram of an agricultural field sprayer according to an exemplary embodiment of the disclosure showing the physical components of the sprayer system.
Figure 2:
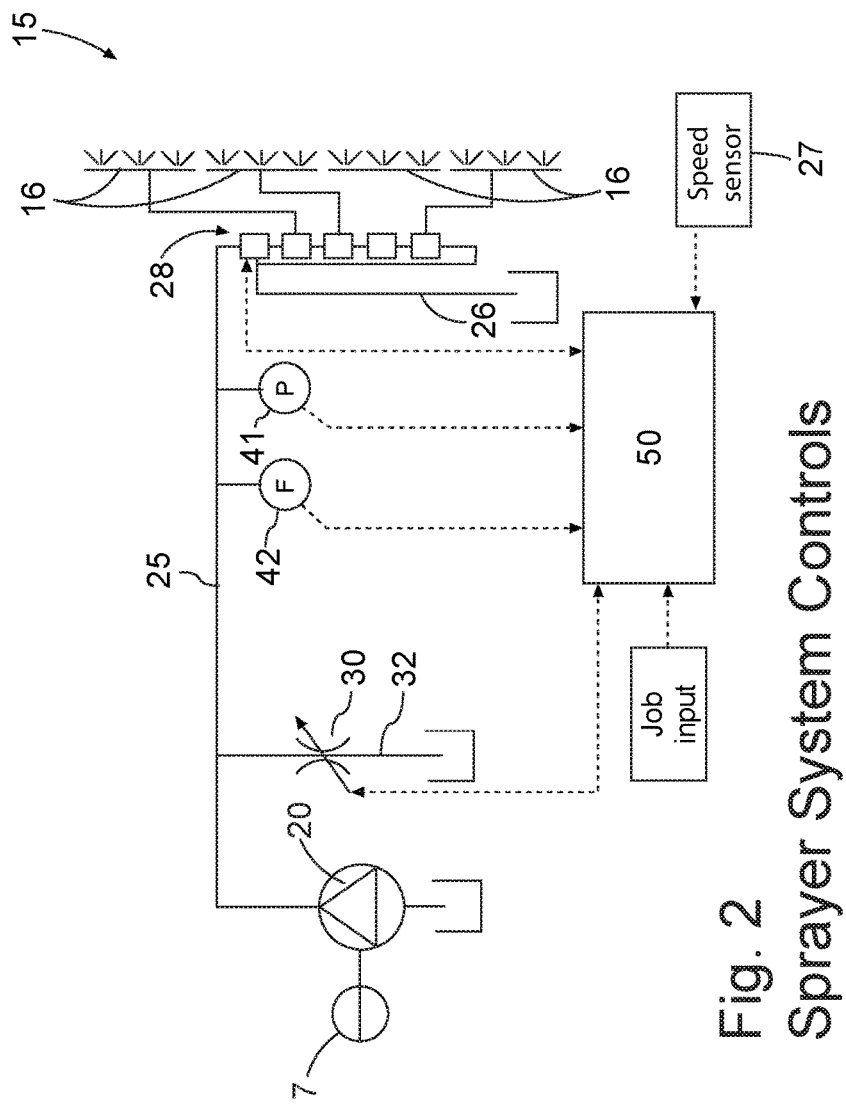
FIG. 2 is a simplified and diagrammatic system illustration of the agricultural field sprayer according to FIG. 1, showing only the elements that are relevant for the controller the sprayer.
Figure 3:
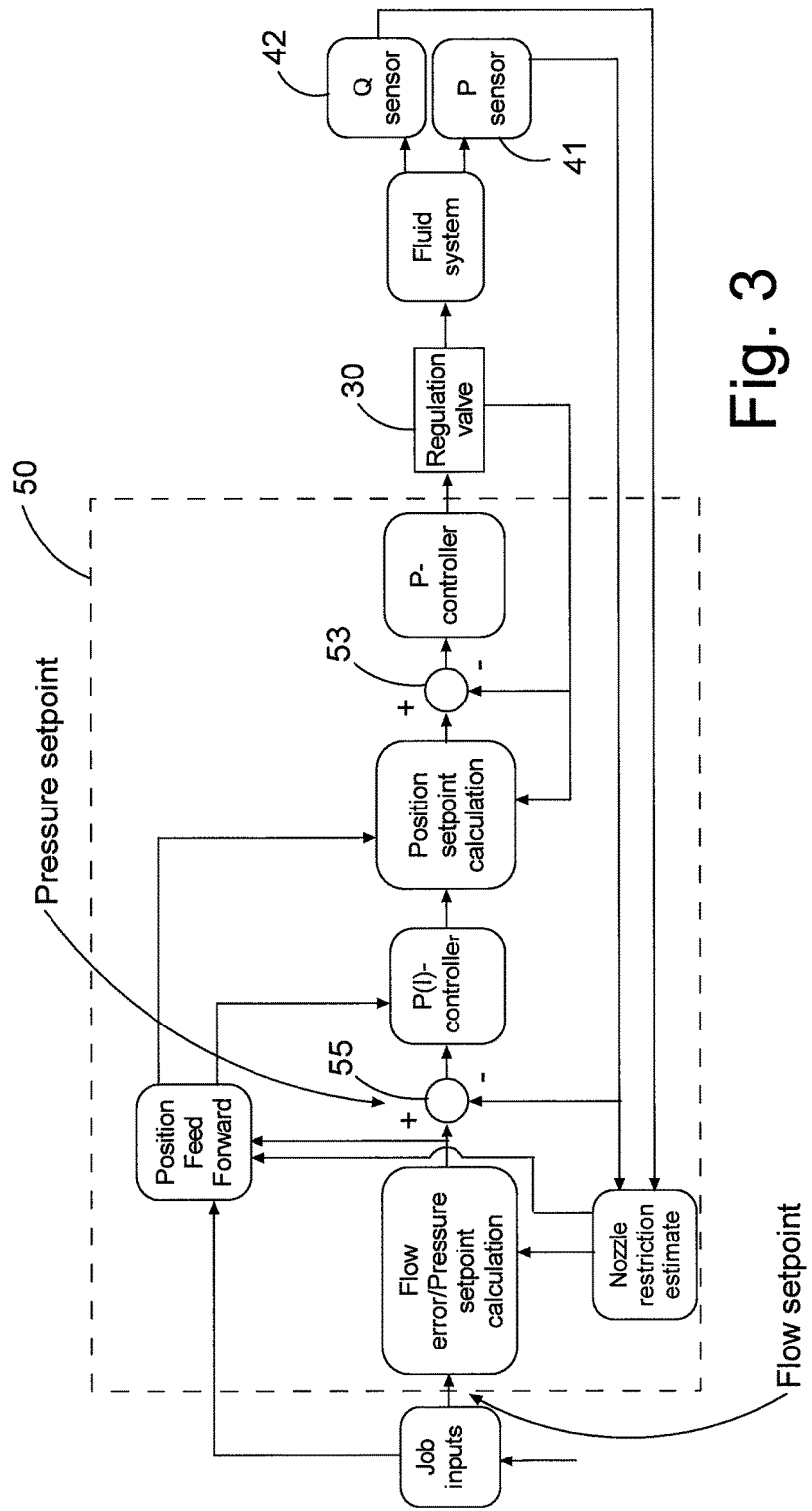
FIG. 3 is a diagram showing the control system indicated in FIG. 2 in greater detail in an operative state where the signal from all sensors is available.

In the following detailed description, the agricultural field sprayer will be described by the exemplary embodiments. FIGS. 1 to 3 show an agricultural field sprayer and a control system therefor according to an exemplary embodiment.

In the present exemplary embodiment the agricultural field crop and field sprayer 1 is a tractor pulled sprayer (trailer sprayer). However, it is understood that the sprayer may just as well be a self-propelled sprayer.

With reference to FIGS. 1 and 2 the sprayer 1 has a main tank 10 carried by a frame that also supports the wheels (not shown). The inlet of motor driven pump 20, e.g. by power take off PTO 7 from a tractor is selectively connected to the main tank 10 for holding spray liquid or connected to a rinse tank 11 (for holding clean water) via an inlet conduit 12 that includes a suction section valve 14 for selecting the respective tank to be connected to the pump inlet 9.

Description of Fluid System

In the present embodiment the pump 20 is a positive displacement pump, preferably a diaphragm pump having a plurality of diaphragms, e.g. in a star arrangement with a central crankshaft that can be coupled to the power take-off PTO from a tractor that pulls the sprayer 10. Alternatively, a piston pump or a centrifugal pump can be used.

The outlet of the pump 20 is connected to a feed conduit 25 that leads to an electronically controlled valve arrangement 28 that includes a plurality of electrically or electronically controlled section valves 29. The feed conduit 25 includes a filter 23 and a one way valve 24.

The inlet 9 of the pump 20 is connected to the outlet of a regulation valve 30 via a return conduit 32 and to a suction section valve 14. Suction selection valve 14 selectively connects the inlet 9 to the main tank via conduit 12 that includes a filter 13 or to a fast filler coupler 38.

An agitation conduit 18 branches off from conduit 25. The agitation conduit 18 includes an agitation valve 17 and leads to an agitator 19 in the main tank 10 for agitating the fluid in the main tank when necessary, e.g. to avoid precipitation.

A pressure selection valve 21 has an inlet receiving fluid from the feed conduit 25 and the pressure selection valve 21 can selectively connect its inlet to internal tank cleaning nozzles 34 or to a pressure draining coupler 39 or to chemical filler 37 via one of its three respective outlet ports. An on off/valve 22 is connected to pressure selection valve 21, i.e. on/off valve 22 changes position when pressure selection valve 21 changes position. The pressure selection valve 21 has four positions. In one position it closes all of its ports and the on/off valve 22 is open, i.e. the fluid from the pump 20 can flow to the valve arrangement 28 and to the regulation valve 30. In the other three positions the pressure selection valve 21 connects to one of the three outlet ports and the on/off valve 22 is closed and does not allow flow to the valve arrangement 28 and to the regulation valve 30.

A manually operated pressure selection valve 21 has been shown in FIG. 1, however it should be understood that an electrically actuated pressure selection valve 21 could be used instead.

A safety valve 35 that opens to the main tank is directly connected to the feed conduit 25.

The valve arrangement 28 selectively connects the feed conduit 25 to a bypass line 26 during non-spraying.

The agricultural field sprayer and/or washer 1 is provided with a boom 15 with a large number of spray nozzles. The boom 15 is divided into a plurality of boom sections 16, typically into 3 to 13 sections, each boom section 16 carrying a plurality of spray nozzles.

During spraying, the valve arrangement 28 connects the feed conduit selectively to one or more or to all boom sections 16 through individual activation of the section valves 29. Each boom section 16 is provided with one or more spray nozzles and each boom section is connected to a section valve 29. The restriction to flow of the spray nozzles on the boom sections 16 can be manually changed by an operator. Typically a plurality of spray nozzles is provided on a revolving head with one of the spray nozzles in an active position, whilst manual rotation of the head by an operator selects another spray nozzle. Thus, different nozzles are readily available for accommodating to different spray conditions. The operator can change the nozzle type to adapt to actual requirement.

Description of Control Components

The regulation valve 30 is an electronically controllable motorized valve. The regulation valve 30 can be positioned within a range of positions between two extreme positions. The first extreme position provides the lowest restriction to flow whilst the opposite second extreme position provides the highest restriction to flow (i.e. completely closed) through the regulation valve. When the regulation valve 30 changes position towards the first extreme position the restriction to flow decreases and when the regulation valve 30 changes position towards the second extreme position the restriction to flow increases.

In an embodiment the regulation valve 30 is an electronically controllable motorized valve. This regulation valve 30 has a movable valve member that defines a controllable flow opening and an electric drive motor coupled to the valve member via a reduction gear. The opening area of regulation valve is infinitely variable, i.e. the opening can be varied continuously (stepless) between two extreme positions through operation of the electric drive motor. The movable valve member can e.g. be a disc, a plate or a ball and various materials such as plastic, steel or ceramics can be used. In an embodiment, the regulation valve 30 is provided with an electric drive motor that drives the valve member via a reduction gear. The position of the regulation valve is measured by a position sensor (not shown) and the sensor produces a signal representing the position of the regulation valve 30. Typically, the valve member position is an angle and the position sensor is thus an angle sensor.

Typically, this type of regulation valve 30 has a relatively slow response to a demand of change of position, from e.g. a control signal. A typical response time for this type of regulation valve is in a range between 5 and 20 seconds for moving the valve from one extreme position of the valve 30 to the opposite extreme position of the valve 30. The reduction gear may be configured such that the electric drive motor needs to make between 15000 and 120000 revolutions for moving the valve 30 from one extreme position to the other extreme position.

A pressure sensor 41 measures the pressure in the feed conduit 25 of the fluid that is delivered to the valve arrangement 28 and the pressure sensor 41 generates a signal indicative thereof. In an embodiment, the pressure sensor 41 is positioned just upstream of the valve arrangement 28.

A flow sensor 42 measures the flow in the feed conduit 25 to the valve arrangement 28 and the flow sensor 42 generates a signal indicative thereof. In an embodiment, the flow sensor 42 is positioned just upstream of the valve arrangement 28.

A controller 50 controls the operation of the sprayer and is configured to be operating in various modes, such as auto auto/full functionality mode, or manual mode. In the manual mode the operator controls the position of the regulation valve 30 directly. In the auto/full functionality mode that is described in detail below the controller determines automatically amongst others an appropriate position for the regulation valve 30, spray pressure increase/decrease and nozzle flow setpoint (l/min).

In the auto mode the controller 50 receives job input from an operator. Job input can be a command from the operator, such as spray ON or spray OFF, desired application rate, number of nozzles selected, and various other settings. Other job inputs determined by the operator are e.g. sprayer velocity (m/s), pump rotational speed (RPM), and total number of nozzles.

On the basis of the job input the controller 50 determines the nozzle flow setpoint. The nozzle flow setpoint is the flow setpoint per spray nozzle. Every spray nozzle covers a given spraying width. The operator sets the setpoint for applied volume per area (application rate). The field sprayer 1 is driven at given speed. Then the flow setpoint per nozzle is calculated from the information above.

The spray nozzles are mounted on a revolving head holding e.g. 5 spray nozzles, so that it is easy for the operator to change spray nozzle by rotating the revolving head. Normally the selected spray nozzles are of the same type over the whole boom 15.

The flow rate and pressure of the fluid delivered to the valve arrangement 28 are known from signals of the sensors 41 and 42 that are fed to the controller 50. The controller 50 receives a signal representative of the position of the regulation valve 30 and sends a control signal to the regulation valve 30. The controller sends control signals to the valve arrangement 28 and to the individual section valves 29 therein.

Description of Modes of Control Loops

The pressure regulation system is based on 3 closed loops combined with feed forward. In normal spraying conditions the system uses all three control loops, but will use middle and inner control loop if one or more sensors fail.

In the first closed loop, the inner control loop controls the position of the regulation valve 30 using the signal from the regulation valve opening position sensor 31.

In the second closed loop, the middle control loop works in 2 modes: Mode 1 applies when the pressure sensor 41 is functional and the middle control loop controls pressure on the boom. Mode 2 applies when the pressure sensor 41 is not functional, then the loop controls flow to the boom 15.

Setpoints for the control the boom pressure or boom flow are based on application rate, boom width and forward speed.

In the third closed loop, the outer control loop adjusts the flow restriction factor formed by the nozzle size based on simultaneous flow and pressure signals. Hereby, a flow setpoint is converted to a pressure setpoint. When the pressure sensor is not functional, the operator must setup/type in the flow restriction factor.

During spraying the restriction to flow is determined by the resultant restriction determined by the active nozzles. The number of active spray nozzles is also known by the controller 50 as the controller 50 determines which and how many boom sections 16 are active through a control signal to the valve arrangement 28. This information allows the controller 50 to determine the restriction to flow of the nozzles and of a single nozzle and thereby to determine the nozzle size/type, i.e. flow restriction of the nozzle, by solving the equation that describes the relation between pressure and flow. In an embodiment this determination is done assuming that the pressure increases exponentially (to the power of 2) with increasing flow rate and vice versa.

As the flow measurement and pressure measurements are different in dynamic response, the measurements are in an embodiment low pass filtered to obtain similar dynamics for the values used for calculation.

In an embodiment the resulting estimate of the restriction of the nozzles in use is low pass filtered to obtain an estimate that is stable. In an embodiment the restriction of the nozzles in use is calculated continuously.

The estimated or determined restriction of the nozzles is used by the controller 50 to determine the setpoint for the regulation valve 30.

The controller 50 calculates a pressure setpoint when a pressure signal is available from the pressure sensor 41.

The controller 50 calculates the pressure setpoint from the equation that describes the relation between the pressure and the flow with the above estimated nozzle restriction and assuming that the pressure increases exponentially (to the power of 2) with increasing flow rate and vice versa.

In full functionality mode the pressure setpoint and flow setpoint for spraying are known, the setpoint for the regulation valve 30 is calculated by the controller 50 and is in an embodiment used in feed forward control. This feed forward control takes into account the requested application rate, the number of nozzles within active sections, the driving speed and the resulting nozzle restriction. From these a feed forward flow setpoint is calculated by the controller 50.

FIG. 3 shows the controller 50 in greater detail with the control loops. The controller 50 includes a position controller (P-controller) that controls the position of the regulation valve 30. A position sensor 31 on the regulation valve provides a signal corresponding to the position of the valve 30. The position controller is a proportional controller. The output of this controller drives the speed of the electric drive motor changing the regulation valve position.

The regulation valve position signal is fed to summing point 53. Summing point 53 also receives a signal for an angle setpoint calculation component. The angle setpoint calculation component receives a position signal from the regulation valve, a signal from a P(I) controller and a signal from the angle feed forward calculation component.

The P(I) controller receives a signal from the feed forward calculation component and from a summing point 55. Summing point 55 receives the signal from the pressure sensor 41 (subtracted) and a signal from a Flow/Pressure setpoint calculation component. In a full functionality mode the P(I) controller receives a pressure setpoint signal.

Flow/Pressure setpoint calculation component receives a signal from the Nozzle restriction estimate calculation component and a flow setpoint signal from the job inputs. If the pressure signal is available, the Flow/Pressure setpoint calculation determines a pressure setpoint and sends the determined pressure setpoint to the summing point 55 and to the Angle feed forward calculation component.

If the pressure signal is not available (see FIG. 5) the Flow/Pressure setpoint calculation component determines a flow setpoint and sends the determined flow setpoint to the summing point 55 and to the Angle/position feed forward calculation component.

The Nozzle restriction estimate calculation component receives the job input, the pressure signal and the flow signal, and processes these inputs and outputs a nozzle restriction estimate to the Flow error/Pressure setpoint calculation component.

The Flow error/Pressure setpoint calculation component with the summing point 55 and the P(I) controller forms the outer loop controller and it is implemented as a PI-controller. It can operate as a pressure controller and as a flow controller. When pressure measurement is available, the operation is pressure control. This is preferred due to better resolution and linearity for pressure measurement over flow measurement, especially at low flow rates. The pressure controller operates with a setpoint obtained from a flow setpoint via the nozzle restriction estimate.

When the pressure signal is not available the middle loop is controlled using the measured flow rate compared to a calculated desired flow rate.

The position feed forward calculation component receives the job inputs, the output signal from the Flow error/Pressure setpoint calculation and on the basis of these signals the feed forward calculation component determines an anticipated correct setpoint for the regulation valve 30 and outputs a feed forward signal for the P(I) controller and the position setpoint calculation component. Thus, the position setpoint calculation component receives feed forward signal and is able to start and speed up movement of the relatively slow regulation valve 30.

The angle setpoint for the regulation valve 30 is combined from the position feed forward and the position compensation (output from outer loop controller).

In an embodiment the feed forward setpoint for the regulation valve 30, as handled by the Position feed forward component takes into account the regulation valve characteristic. The Position feed forward component takes into account the requested application rate, the number of nozzles within open sections, the driving speed, the nozzle restriction and pump flow. From these the pressure setpoint is calculated.

The outer loop controller is a PI-controller and during steady conditions, the integral part will provide the angle setpoint value adequate for the working conditions The regulation valve 30 is controlled in response to the signals from up to five main sensors:

Sprayer velocity (speed) sensor. This sensor senses the sprayer forward speed which is used for calculating the volume rate at all spraying speeds.

Pressure sensor 41.

Flow sensor 42.

Position (angle) sensor 31.

PTO 7 RPM sensor reads the pump RPM which corresponds to the pump speed and is used to calculate the flow from the pump.

In an embodiment a regulation valve 30 position sensor 31 reads the opening angle for the rotary valve inside the regulation valve 30. When opening angle (valve position) is known, the flow can be calculated when the pressure is also known. The controller 50 can with the ground speed, pump RPM, valve positions and nozzle type/restriction and other information predict the correct set point for the regulation valve 30 in a Feed Forward fashion before spraying is OFF. Thereby the volume rate is correct even the forward speed has changed significant since the main OFF was closed (no fluctuation).

The position of the regulation valve 20 is adjusted by a servo/drive motor that drives the valve member via a gearbox. In an embodiment two ceramic discs in the regulation valve 30 regulate the pressure and ensure quick reaction and zero leakages. Sprayer ground speed, power take off (PTO) RPM and number of boom sections 16 activated are parameters used, and the benefit is more precise application rates from the second the sprayer 1 begins spraying.

The controller 50 starts and moves the regulation valve 30 towards the final position, i.e. desired setpoint immediately after the operator makes changes, i.e. sends new instructions. E.g. when section valves 29 are opened or closed, the regulation valve 30 is started at same time as the section valves 29 are instructed to change position.

The five sensors are also back-up for each other and ensure that the system can continue regulation even if one or more sensor signal fails. Sensors used are:

Sprayer speed sensor

Flow sensor 42

Pressure sensor 41

Pump r.p.m. sensor 27

Regulation valve position sensor 31.

The sprayer speed sensor can be part of the field sprayer 1 or it can be on the tractor pulling the agricultural sprayer. The signal can be derived from the wheel speed of the agricultural sprayer or the tractor or the sprayer sensor can be GPS based. Other sensor types such as radar based can also be used.

During operation one of the feed forward functions works as follows. The agricultural sprayer 1 pulled by a tractor over the field. Just before the tractor reaches headland the operator slows it down to a speed at which it can make a 180° turn with a radius that corresponds roughly to half the width of the sprayer boom 15. Typically, the turning speed is approximately two thirds of the spraying speed. Since the agricultural sprayer 1 position behind the tractor is still spraying when the tractor is turning, i.e. the agricultural sprayer slows down while spraying the last portion of the field before reaching the headland. The controller 50 changes the position of the regulation valve 30 accordingly to reduce the flow rate to the valve arrangement 28 in order to assure a constant application rate. When the sprayer boom 15 reaches the headland the operator gives the signal spray OFF. At this point in time the tractor is still making the 180° turn. At the end of the 180° turn the operator starts accelerating the tractor back to its regular spraying speed and when the sprayer boom 15 leaves the headland and reaches the area to be sprayed the tractor and the agricultural sprayer 1 have or almost have reached spraying cruising speed.

Without special measures, the regulation valve 30 would still be at the position that corresponds to an application rate of the ground speed of the tractor in the 180° turn. If this would be the case, there will be a pressure drop when the operator sends the signal spraying ON, since the regulation valve is a position that corresponds to a flow rate that is much lower than the actually required flow rate (for the actual speed of the sprayer). This would mean that the application rate would be well below the desired application rate and since the regulation valve 30 is (relatively) slow to respond to instructions to change position this would mean that the application rate would stay well below the desired to application rate for quite a while.

However, the controller 50 is provided with a feed forward function on the sprayer speed than is also active during non-spraying (spraying OFF).

Consequently, the controller 50 commands the regulation about 30 to start moving towards a setpoint that corresponds to the setpoint that would be correct if the sprayer was actually spraying (spraying ON). This means that the controller 50 starts moving the regulation valve 30 in the closing direction as soon as the controller receives a signal that the ground speed of the agricultural sprayer 1 is increasing during headland operation (spraying OFF).

During normal spraying operation the position of the regulation of valve 30 is controlled as described further above in relation to amongst others the pressure signal. However, when the operator or the controller 50 decides to switch boom sections 16 on or off during spraying, the controller 50 is configured to control the position of the regulation of valve 30 only with feed forward for the time that it takes the selection of valve or valves to change position.

One of the reasons for controlling the position of the regulation valve 30 with feed forward is the fact that the changing of the position of section valves in the valve arrangement 28 causes some pressure fluctuations that could disturb the control system. Another reason is the fact that turning off or turning on a boom section 16 causes a significant change in resistance to flow. If it would take a long time for the regulation valve to adapt to the changing resistance to flow, that would be a relatively long period with operating with an incorrect pressure and an incorrect flow. Since the regulation of valve 30 is relatively slow to change position in response to the control signal, the controller 50 is configured to start changing the position of the regulation valve immediately when any of the section valves 29 receives a signal to change position. Thus, during the time that a section valve is closing the controller 50 issues as signal to the regulation valve 30 to start moving in an opening direction towards a new set point with a lesser restriction to flow. During the time that a section valve 29 is opening the controller 50 issues a signal to the regulation valve 30 to start moving in a closing direction towards a new set point with an increased restriction to flow. When operating under feed forward the controller 50 may instruct the regulation of valve 30 to change position as fast as possible. As soon as the section valve 29 or section valves 29 have finished changing position, the controller 50 switches back to normal operation.

Operation with Sensor Failure Other Faults

The controller 50 is configured such that the sprayer 1 is fully functional though with degraded functionality in case of missing sensor signals.

The controller 50 is configured such that the sprayer 1 is fully functional though with degraded functionality if faults occur in fluid system, e.g. pump defects, partially clogged filters, leaking valves.

When all sensors (Angle=regulation valve position form a position sensor), Pump RPM, Flow to boom, pressure to boom and Sprayer Speed) are available the controller 50 operates in a mode called the full functionality mode, that is described above in detail and illustrated with reference to FIG. 3.

The controller 50 registers the availability of the sensor signals. The controller 50 is configured to automatically switch to a specific one of a plurality of sensor fail modes (fail-safe modes) when one or more of the sensor signals is/are not available to the controller 50. The sensor fail modes ensure continued operation of the sprayer 1 with reduced functionality, as described in table 1. The sensor fail modes will typically require additional action by the operator when compared to the full functionality mode. When one of the sensor signals is not available for the controller 50, will issue an alarm that is notified to the operator, e.g. via a display (not shown) or by an audible alarm.

The controller 50 is configured to be in receipt of a group of signals needed to automatically determine the desired setpoint for the regulation valve 30. This group of signals including a signal from the pressure sensor 41 providing a signal representing the pressure of the fluid delivered to the valve arrangement 28, a signal from the flow sensor 42 representing the flow rate of the flow to the valve arrangement 28, a signal from the regulation valve position sensor 31 representing the position of the regulation valve 30, a signal from the pump speed sensor 27 representing the speed of the pump 20, and a signal from the sprayer speed sensor sensing the speed of the agricultural crop and field sprayer 1. The sprayer speed sensor and the pump speed sensor do not need to be part of the agricultural sprayer 1, and could be part of a tractor (not shown) pulling the agricultural sprayer 1. The controller 50 may in addition to the signals in the above group receive many other signals that relate to other tasks, such as signals from e.g. a main tank full sensor, rinse tank full sensor, rinse tank flowmeter, but these signals are not essential to the in the present context.

The controller 50 is configured to control the position of the regulation valve 30 in accordance with a plurality of operation modes. The controller 50 is configured to automatically select an appropriate one of the operation modes, bases on the availability of the sensor signals in the above described group of signals.

The plurality of operation modes includes a full functionality mode and a plurality of fail-safe modes.

The controller 50 is configured to operate the agricultural crop and field sprayer 1 in the full functionality mode when the signal of the pressure sensor 41, the flow sensor 42, the signal of the regulation valve position sensor 31, the signal of the a pump speed sensor 27 and the signal of the sprayer speed sensor are all available.

The controller 50 is configured to operate the agricultural crop and field sprayer 1 in one of the fail-safe (reduced functionality) modes when one or more of the signals of the

TABLE 1

| Angle | RPM | Flow | Press | Speed signal | Mode for regulation | Loop | Nozzle | Speed control |
|---|---|---|---|---|---|---|---|---|
| Use | Use | Use | Use | Use | Full functionality | P | Automatically | Automatically |
| Defect | Ignore | Ignore | Ignore | Ignore | Reduced functionality 1 | Adjust pressure after mechanical pressure gauge | | |
| Use | Defect | Use | Use | Use | Reduced functionality 2 | P | Automatically | Automatically |
| Use | Ignore | Defect | Use | Use | Reduced functionality 3 | P | Manually enter new size when changing nozzle | Automatically |
| Use | Defect | Defect | Use | Use | Reduced functionality 3 | P | Manually enter new size when changing nozzle | Automatically |
| Use | Ignore | Use | Defect | Use | First Reduced functionality | Q | Automatically | Automatically |
| Use | Defect | Use | Defect | Use | First reduced functionality | Q | Automatically | Automatically |
| Use | Ignore | Defect | Defect | Ignore | Reduced functionality 5 Manual only | Adjust pressure after mechanical pressure gauge | | |
| Use | Use | Use | Use | Defect | Reduced functionality 6 Spray at constant speed | P | Automatically | Keep sprayer at constant driving speed | above described group of signals is not available to the controller 50.

In an embodiment, there is a fail-safe mode for each of the situations where one of the signals in the group is not available to the controller 50.

According to another embodiment there is a fail-safe mode for several situations where a combination of several of the signals of the group is not available to the controller 50.

In the full functionality mode the controller 50 is configured to control the position of the regulation valve 30 in a closed loop using the pressure signal in relation to a desired pressure setpoint, configured to determine the restriction to flow of the active spray nozzles, configured to determine the desired position for the regulation valve 30 automatically in relation the determined the restriction to flow, and configured to adapt the desired pressure setpoint in relation to the sprayer speed signal.

Figure 5:
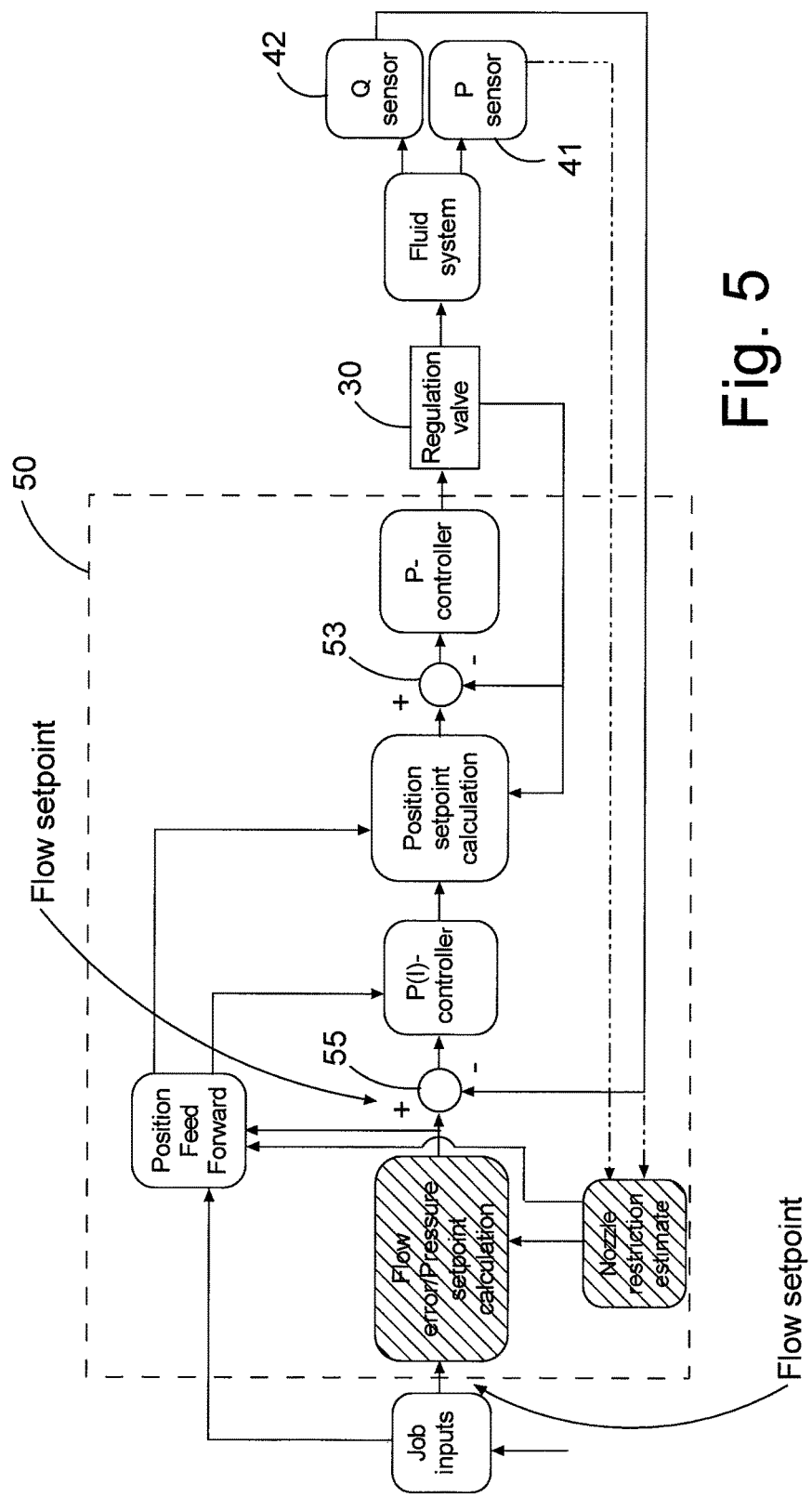
FIG. 5 is a diagram showing the control system indicated in FIG. 2 in greater detail in an operative state where the signal from the pressure sensor is not available.

In a first fail-safe mode controller 50 is configured to control the position of the regulation valve 30 in a closed loop using the flow signal in relation to a desired flow rate setpoint, when the signal from the pressure sensor (41) is not available, as illustrated with reference to FIG. 5. In the first fail-safe mode the nozzle restriction estimate is not performed and the summing point 55 receives a flow setpoint directly from the job inputs.

The controller is configured to assume that the restriction to flow is a predetermined relatively large restriction to flow when said predetermined period of time without spraying has lapsed. The controller is configured to adapt the position of the regulation valve 30 accordingly to the predetermined relatively large restriction to flow. This fictive large restriction to flow will be kept until changed by operator input or a new calculated value when the sensor signals are available again.

In an embodiment the controller 50 is configured also to use the first fail-safe mode when the signal from the pressure sensor 41 and the pump speed signal are both not available.

Figure 4:
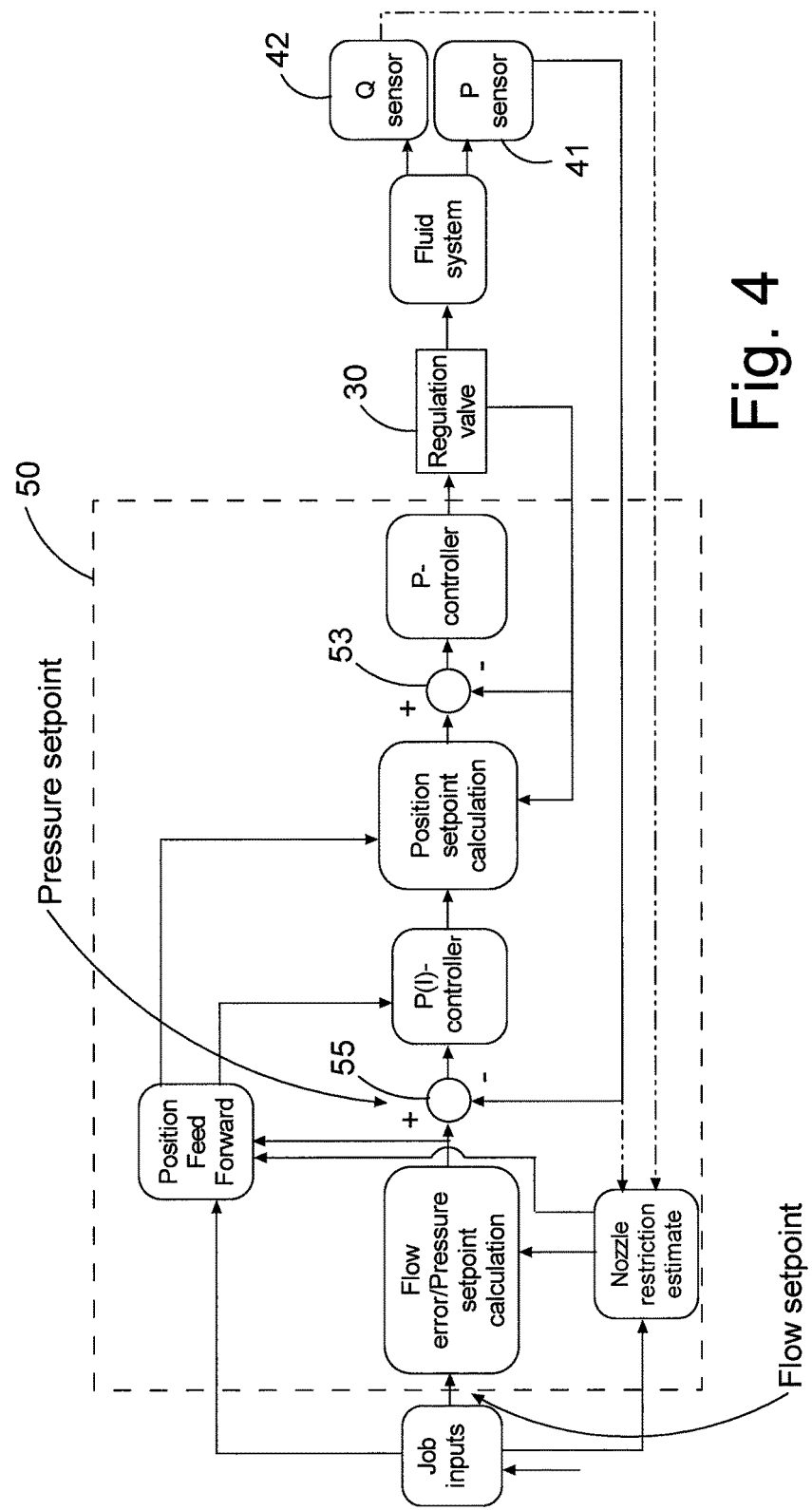
FIG. 4 is a diagram showing the control system indicated in FIG. 2 in greater detail in an operative state where the signal from the flow sensor is not available.

A second fail-safe mode is used by the controller 50 when the signal from the flow sensor 42 is not available, as illustrated with reference to FIG. 4. In the second fail-safe mode the controller 50 does not determine the actual restriction to flow of the active spray nozzles, and in the second fail-safe mode the controller 50 is configured to determine the desired position of the regulation valve 30 based on the last determined restriction to flow before flow sensor signal became unavailable or the controller 50 is configured to determine the desired position of the regulation valve 30 based on the a (manual) entry by an operator indicating the restriction to flow.

In an embodiment the controller 50 is configured also to use the second fail-safe mode when the signal from both the flow sensor 42 and the pump speed signal are not available.

A third fail-safe mode is used when the sprayer speed signal is not available. In the third fail-safe mode the controller 50 is configured to determine the desired position of the regulation valve 30 based on an entry by an operator indicating the sprayer speed.

In an embodiment the controller 50 is configured to use feed forward control in the full functionality mode, and wherein the controller 50 is in this embodiment configured to use in a fourth fail-safe mode that does not use feed forward control when the pump speed signal is not available.

If the regulation valve position signal is not available to the controller 50 the operator has to manually set the position of the regulation valve 30 on the basis of the manually read pressure on the feed conduit 25 and the controller 50 is thus effectively bypassed.

It is an advantage of the present disclosure that no setup or tuning required for nozzle change as the nozzle estimate function of the controller 50 automatically determines the type of nozzle that is present/selected.

It is an advantage of the present disclosure that over pressure situations e.g. after running empty and refill of main tank are avoided.

In an embodiment the controller 50 is configured to determine the desired position for the regulation valve 30 without the use of feed forward when the signal from the pressure sensor 41 is not available.

In an embodiment the controller 50 is configured to determine the desired position for the regulation valve 30 without the use of feed forward when the signal from the flow sensor is not available.

The term "comprising" as used in the claims does not exclude other elements or steps. The term "a" or "an" as used in the claims does not exclude a plurality. The single processor or other unit may fulfill the functions of several means recited in the claims.

The reference signs used in the claims shall not be construed as limiting the scope.

Although the present disclosure has been described in detail for purpose of illustration, it is understood that such detail is solely for that purpose, and variations can be made therein by those skilled in the art without departing from the scope of the disclosure.

The invention claimed is:

1. An agricultural crop and field sprayer (1), said sprayer (1) comprising:
    a sprayer fluid tank (10),
    a pump (20), the inlet of the pump (20) being in fluid communication with said tank (10),
    a boom (15) divided in boom sections (16) and each boom section being provided with a plurality of spray nozzles,
    a valve arrangement (28) associated with said boom sections (16),
    a feed conduit (25) for establishing fluid communication between an outlet of said pump (20) and said valve arrangement (28),
    said valve arrangement (28) being configured for selectively connecting the feed conduit to a bypass conduit or to one or more of the boom sections (16),
    a return conduit (32) branching off from the feed conduit (25),
    a regulation valve (30), said regulation valve (30) applying a variable degree of throttling to the fluid flowing from the feed conduit (25) through said return conduit (32), said variable degree of throttling depending on the position of the regulation valve (30),
    a controller (50), characterized by
    said controller (50) being configured to be in receipt of a group of signals, said group of signals including a signal from:
        a pressure sensor (41) providing a signal representing the pressure of the fluid delivered to said valve arrangement (28), a flow sensor (42) providing a signal representing the flow rate of the flow to said valve arrangement (28), a regulation valve position sensor (31) sensing the position of the regulation valve (30), a pump speed sensor (27) sensing the speed of the pump (20), a sprayer speed sensor sensing the speed of the agricultural crop and field sprayer (1), said controller (50) being configured to control the position of said regulation valve (30) in accordance with a plurality of operation modes, and said controller (50) being configured to automatically select an appropriate one of said operation modes, said plurality of operation modes including a full functionality mode and a plurality of reduced functionality modes, said controller (50) being configured to operate said agricultural crop and field sprayer (1) in said full functionality mode in response to all of the signals from said pressure sensor (41), said flow sensor (42), said regulation valve position sensor (31), said pump speed sensor (27) and said sprayer speed sensor, said controller (50) being configured to operate said agricultural crop and field sprayer (1) in said full functionality mode when the signal of said pressure sensor (41), the signal of said flow sensor (42), the signal of said regulation valve position sensor (31), the signal of said pump speed sensor (27) and the signal of said sprayer speed sensor are all available to the controller (50), said controller (50) being configured to operate said agricultural crop and field sprayer (1) in one of the reduced functionality modes when one or more of the signals from said pressure sensor (41), the signal of said flow sensor (42), the signal of said regulation valve position sensor (31), the signal of said pump speed sensor (27) or the signal of said sprayer speed sensor is not available to the controller (50), and said controller (50) being configured to use all available signals from said pressure sensor (41), said flow sensor (42), said regulation valve position sensor (31), said pump speed sensor (27) and said sprayer speed sensor when operating in one of the reduced functionality modes.

2. An agricultural crop and field sprayer (1) according to claim 1, wherein there is a reduced functionally mode for each one of the situations where one of the signals in said group is not available to the controller (50).

3. An agricultural crop and field sprayer (1) according to claim 1, wherein there is a reduced functionally mode for several situations where a combination of several of the signals of said group is not available to the controller (50).

4. An agricultural crop and field sprayer (1) according to claim 1, wherein said controller in said full functionality mode is configured to:
control the position of said regulation valve (30) in a closed loop using the pressure signal in relation to a desired pressure setpoint,
to determine the restriction to flow of the active spray nozzles,
determine the desired position for the regulation valve (30) automatically in relation to the determined restriction to flow, and
to adapt the desired pressure setpoint in relation to the sprayer speed signal.

5. An agricultural crop and field sprayer (1) according to claim 1, wherein said controller (50) is configured in a first reduced functionality mode to control the position of said regulation valve (30) in a closed loop using the flow signal in relation to a desired flow rate setpoint, when the signal from the pressure sensor (41) is not available.

6. An agricultural crop and field sprayer (1) according to claim 4, wherein said controller (50) is configured to use said first reduced functionality mode when the signal from the pressure sensor (41) and the pump speed signal are not available.

7. An agricultural crop and field sprayer (1) according to claim 1, further comprising a second reduced functionality mode used by the controller (50) when the signal from the flow sensor (42) is not available, wherein said controller (50) in said second reduced functionality mode does not determine the actual restriction to flow of the active spray nozzles, and wherein said controller (50) is configured to determine the desired position of the regulation valve based on the last determined restriction to flow before flow sensor signal became unavailable or said controller (50) is configured to determine the desired position of the regulation valve (30) based on an entry by an operator indicating the restriction to flow.

8. An agricultural crop and field sprayer (1) according to claim 7, wherein said controller (50) is configured to use said second reduced functionality mode when the signal from the flow sensor (42) and the pump speed signal are not available.

9. An agricultural crop and field sprayer (1) according to claim 1, wherein said controller (50) is configured in a third reduced functionality mode to determine the desired position of the regulation valve (30) based on an entry by an operator indicating the sprayer speed, when the sprayer speed signal is not available.

10. An agricultural crop and field sprayer (1) according to claim 1, wherein said controller (50) is further configured to use feed forward control in said full functionality mode, and wherein said controller (50) is configured in a fourth reduced functionality mode not to use feed forward control when the pump speed signal is not available.

11. A method of operating an agricultural crop and field sprayer (1), said sprayer (1) comprising:
a sprayer fluid tank (10),
a pump (20), the inlet of the pump (20) being in fluid communication with said tank (10),
a boom (15) divided in boom sections (16) and each boom section being provided with a plurality of spray nozzles,
a valve arrangement (28) associated with said boom sections (16),
a feed conduit (25) for establishing fluid communication between an outlet of said pump (20) and said valve arrangement (28),
said valve arrangement (28) being configured for selectively connecting the feed conduit to a bypass conduit or to one or more of the boom sections (16),
a return conduit (32) branching off from the feed conduit (25),
a regulation valve (30), said regulation valve (30) applying a variable degree of throttling to the fluid flowing from the feed conduit (25) through said return conduit (32), said variable degree of throttling depending on the position of the regulation valve (30),
a controller (50), said controller (50) being configured to be in receipt of a group of signals, said group of signals including a signal from:
a pressure sensor (41) providing a signal representing the pressure of the fluid delivered to said valve arrangement (28),
a flow sensor (42) providing a signal representing the flow rate of the flow to said valve arrangement (28),
a regulation valve position sensor (31) sensing the position of the regulation valve (30),
a pump speed sensor (27) sensing the speed of the pump (20),
a sprayer speed sensor sensing the speed of the agricultural crop and field sprayer (1), characterized by controlling the position of said regulation valve (30) in accordance with a plurality of operation modes, and automatically selecting an appropriate one of said operation modes, said plurality of operation modes including a full functionality mode and a plurality of reduced functionality modes, operating said agricultural crop and field sprayer (1) in said full functionality mode in response to all of the signals from said pressure sensor (41), said flow sensor (42), said regulation valve position sensor (31),said pump speed sensor (27) and said sprayer speed sensor, operating said agricultural crop and field sprayer (1) in said in said full functionality mode in response to all of the signals from said the pressure sensor (41), said flow sensor (42), said regulation valve position sensor (31), said pump speed sensor (27) and said sprayer speed sensor are all available to the controller (50);

operating said agricultural crop and field sprayer (1) in one of the reduced functionality modes when one or more of the signals from said the pressure sensor (41), said flow sensor (42), said regulation valve position sensor (31), said pump speed sensor (27) and said sprayer speed sensor is not available to the controller (50); and operating said agricultural crop and field sprayer (1) in said reduced functionality mode using all available signals from said pressure sensor (41), said flow sensor (42), said regulation valve position sensor (31), said pump speed sensor (27) when operating in one of the reduced functionality mode.

* * * * *